June 4, 1963  B. GAIOTTO  3,092,333
SPRAY NOZZLE
Filed Oct. 16, 1957
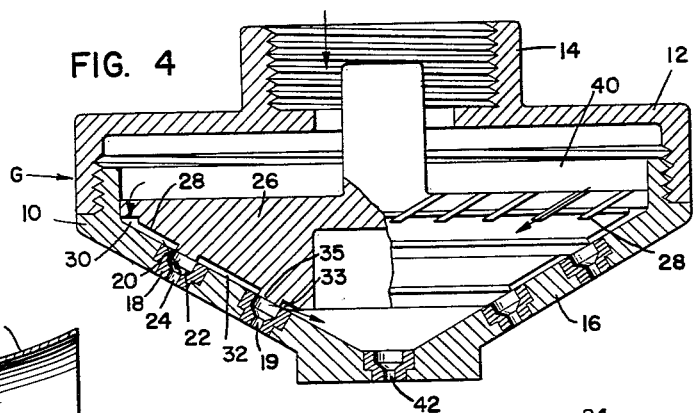
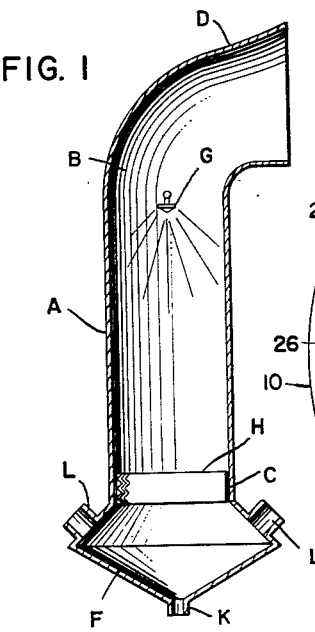
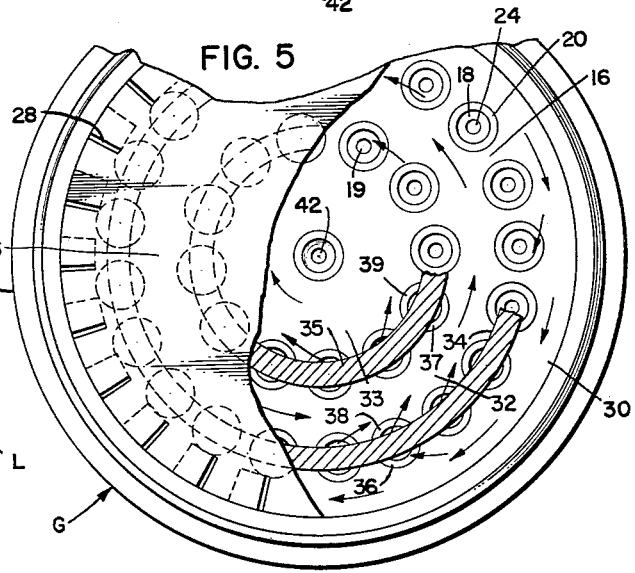
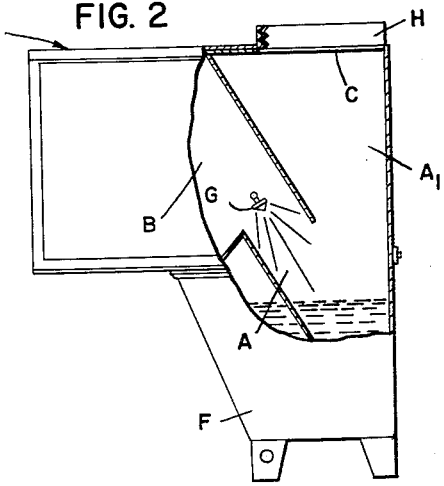
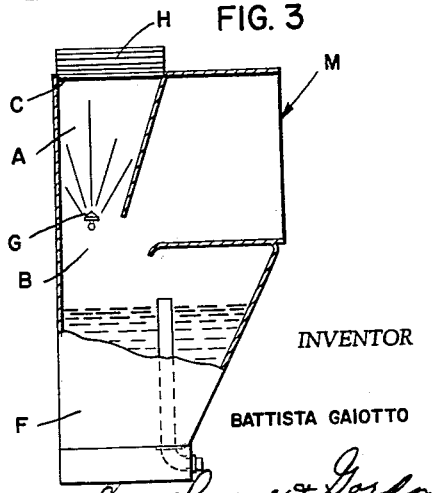
INVENTOR
BATTISTA GAIOTTO
Ely, Pearne & Gordon
ATTORNEY 3,092,333
SPRAY NOZZLE
Battista Gaiotto, 45 Via L. Tolstoi, Milan, Italy
Filed Oct. 16, 1957, Ser. No. 690,480
5 Claims. (Cl. 239—491)

This invention relates to devices for trapping and collecting dust suspended in a gas, and particularly for the separation of dust from and the cleaning of gases in general and for air in particular.

Referring now particularly to air cleaning, the separation of dust from gases in general has been heretofore performed by means of suitable electrostatic or acoustic precipitators and wet scrubbers. The latter type of dust separator has found the widest application, owing to a number of advantageous features. However, a consistent performance by wet scrubbers cannot be relied upon, and the cleaned air (or gas) may at times show a high content of dust in suspension. Thus, a reasonably complete removal of the dust might require the gas to be passed through a number of series connected dust separators. The cleaning of gases by means of known wet scrubbers is obtained by causing the gases to bubble through a suitable liquid—such as, for instance, water contained in a tank or by having water sprays directed against a gas current.

A 100% separation of dust, however, can never be attained by the aforedescribed process, since in the case of bubbling, the air bubbles are always dirty and foul, while in the case of spraying, a really complete atomization of liquid in the gas to be cleaned is very difficult to attain, due to many reasons, and above all to the fact that a spraying of liquid in a manner such as to form a fog having a practically uniform density in all sections of scrubber chamber can be attained only by use of a large number of nozzles.

However, the low efficiency of wet cleaning is mainly caused by a further drawback, that is by the fact, that the air to be cleaned is fed to cleaning device by a sucking or compression action caused by mechanical devices, as for instance fans or exhausters. Obviously, the gas will thereby show a tendency to "blast through," which results in an insufficient liquid-gas contact time, while the dust particles will remain always coated with an air film, which prevents a wetting and precipitation thereof. A further ill-effect is caused by the particular action of the air—as sucked or blown by mechanical devices—onto the minute droplets of atomized liquid, which are thereby caused to collect themselves together into larger drops, showing a very low dust trapping efficiency; in addition, due to the not negligible mass of such drops, a given acceleration speed is imparted by the air thereto, whilst the dust particles, due to their little mass, will remain suspended in the air.

The problem of trapping the dust suspended in gases in general, and of cleaning same gases, is advantageously solved in a complete manner by this invention, which permits attaining high cleaning efficiencies, as for instance up to 99.8% even when very fine dust particles, as for instance sprayed paint particles are present in such gases.

The equipment for trapping suspended particles in a gas is characterized in that it comprises a chamber, provided with gas inlet and outlet, as well as with nozzles by which a liquid is sprayed or atomized into a fog showing a practically uniform density, and with means to cause such fog to flow at a given speed through the mass of gas to be cleaned, further means, fitted at the gas outlet, being provided for having same fog converted again into a liquid containing all precipitated dust, which is then conveniently collected for disposal.

The means by which the liquid is sprayed, and the fog thus obtained is forced at a given speed through the mass of gases, can advantageously consist of fog nozzles, each of which is made-up by a closed shell, provided with nipples to which a feed pipe is connected. The walls of cone-shaped shell bottom are converging toward the outside and show a plurality of calibrated orifices, arranged along at least one circle, which center registers with the bottom axis, while a diaphragm fitted inside the shell, has spirally arranged radial orifices the axis of the spiral line registering with the axis of conical bottom and said diaphragm being provided with at least one annular shoulder, facing the bottom, and dimensioned and arranged in such a manner as to be co-axial with the circular line of bottom orifices. Said shoulder or shoulders are provided to partially close each of said orifices, thereby defining inlet and outlet openings in said orifices, which latter communicate in turn with coaxial annular chambers, as defined by said shoulder or shoulders.

The invention will now be disclosed in the following specification, taken with the accompanying drawing, showing a few advantageous embodiments of the equipment according to the invention said specification and drawing being given only as a not restrictive example of the invention.

In the drawing:

FIG. 1 is a diagrammatic view of the device according to the invention.

FIGS. 2 and 3 are cross sections of two different embodiment forms, particularly suitable for paint spraying or atomizing device.

FIG. 4 is a diametral section of an atomizing nozzle suitable for use in the apparatus.

FIG. 5 is a horizontal section of the nozzle of FIG. 4.

Referring now to FIG. 1, the device, as diagrammatically shown comprises a shell or casing, that defines a chamber A of suitable sizes, and showing opposite openings B and C, the opening B being connected with the piping D, through which the gas to be cleaned is continuously fed, while the opening C leads into a tank F. One or more atomizing or fog nozzles G are arranged inside the chamber A in such a manner as to cause a fog of liquid to be sprayed in the same direction as the flow of gas to be cleaned. Said fog is diffused in such a manner that its density is practically uniform across the whole cross-section area of chamber A, while its speed across the whole length of chamber is greater than the speed of gas to be cleaned, in order to exert a uniform sucking action on same gas in all cross-sections of chamber A. All this in order to obtain that the liquid droplets, being of extremely small size (about one micron), show static features (sizes and mass) and kinetic features (speed and direction of travel) equal to those of dust particles suspended in the gas.

A fog nozzle by which the above requirements are met, will be described later on with reference to FIGS. 4 and 5.

The condenser H, as fitted near opening C of chamber A, consists of a plurality of corrugated diaphragms, by which the fog is forced to accomplish a zig-zag travel, in the course of which it is again condensed or converted into a liquid containing the precipitated dust, and that is collected in an underlying tank F, wherefrom it can be discharged from time to time through a bottom opening K, whereas the cleaned gas, from which all dust has been removed, is discharged through the orifices L formed on the cover of tank F.

The device as shown in the FIG. 2 is substantially like that of FIG. 1 and shows like features, equivalent members being marked with same reference characters. The latter device consists of a casing M, in which the articles to be painted or otherwise coated are arranged. The air inside the casing, which is continuously being loaded with atomized paint and that needs to be cleaned, is sucked by the same atomizing or fog nozzles G and fed through the opening B into the diffuser shaped chamber A. The condensed liquid, containing the dust removed from the air, is collected in the tank F, formed in the bottom of chamber A.

In the aforedescribed embodiment, the fog chamber A extends also upwards and precisely through the chamber A, that shows an opening C, formed on its upper end and in which the condenser device H is fitted.

In the embodiment as shown in FIG. 3, the lower side of casing M is also formed with a tank F, wherein the liquid and the dust are collected. However, in this embodiment the fog chamber A has been simplified showing a vertical course, and the condenser H is fitted in an opening C formed as above on the upper end of same chamber.

Referring now particularly to FIGS. 4 and 5, each fog nozzle G consists of a container 10, closed by cover 12, provided with a nipple 14 by which said container is connected with the piping of scrubbing liquid. The container 10 is provided with a conical shaped bottom 16. The cone angle of such bottom has been suitably provided in order to obtain, as explained later on, a liquid cone showing the required width.

Said bottom has some perforations which are formed on two sets of bushings 18 and 19 pressed into position in said bottom. Said bushings are subdivided into groups, arranged on concentric circles, having their centers on the axis of cone bottom 16. A larger diameter orifice 20 is formed on one end of each one of the bushings of sets 18—19, said orifice being connected through a funnel-shaped wall 22 with a smaller diameter orifice 24, that forms the true atomizing hole.

A diaphragm 26, that consists of a disc with a conical lower face to engage with the inside surface of bottom 16 is fitted inside container 10. Such diaphragm shows all along its periphery, radial slots 28, the longitudinal axes of which lie on a spiral line coaxial with the cone bottom 16. The conical face of diaphragm 26 shows annular grooves 30—32—33, formed by the shoulders 34 and 35, which are arranged in such a manner that their axes (or circular outlines) are intersected by the axes of the orifices 18. Moreover, the thickness of said shoulders is slightly smaller than the diameter of orifices 20, whereby pairs of gaps 36—38 and 37—39, adjacent to each orifice 20, are defined by such shoulders.

An upper chamber 40, that communicates through the spiral slots 28 with the annular groove 30, is defined by the diaphragm 26 fitted inside the container 10—12. Said groove 30 is put into communication, through the gaps 36—38, with the groove 32 which, on its turn, communicates through the gaps 37—39 with the groove 33 connected with the outside through a central fog orifice 42.

After the above stated, the operation of fog nozzle will be apparent, especially when referring to the arrows as shown in the FIGS. 4 and 5.

The liquid fed to chamber 40 through the nipple 14 flows through the radial slots 28 into the groove 30, where (owing to inclination of said slots) a rotary motion is imparted thereto. Thus, a portion of said liquid will flow tangentially from the orifices 36 into the holes 20 of the first hole series 18, thereby taking a whirling and turbulent motion, which causes same liquid to be converted into a fog at the outlet of hole 24. The excess of liquid is discharged through the orifices 28 into the groove 32, thereby taking a rotary motion in a direction opposite to that of groove 30. Then, such excess of liquid flows tangentially from groove 32, through the gaps 37, to the other series of holes 19, wherein it is converted into a fog, whereas the last excess of liquid is discharged through the gaps into the groove 33, wherefrom it is finally discharged through the atomizing nozzle 42. The arrangement of spraying holes as formed on the bushings 18—19 and 42 allows to have the liquid in question converted into an extremely fine and consistent fog, which is sprayed from the holes 24 under the form of a wide cone, showing a uniform density in all its different cross-sections. Moreover, a strong sucking action is exerted by said fog cone onto the air upstream of nozzle G, thereby forcing it (due also to said sucking of injector effect) to pass completely and uniformly through the atomized or fog mass since the dynamic action by which the air is sucked, is caused by same fog. Thus, the dust suspended in the air is forcibly diffused in a highly regular and consistent manner through the whole mass of fog, whereby the dust particles are wetted by liquid droplets showing a size substantially equal to that of same particles. This results in a precipitation of dust, when the fog is converted into a liquid by the aforedescribed condenser H, whereby the air is thoroughly cleaned and even the last trace of dust is removed therefrom.

Modifications and changes could be obviously made to aforedescribed equipment, according to the requirements of the intended application; the same is also for the atomizing nozzle G.

While the invention has been described with some detail, it is to be understood that the specification is for the purpose of illustration only, and is not definitive of the limits of the inventive idea. The right is reserved to make such changes in details of construction and arrangement of parts, as will fall within the scope of the attached claims.

What I claim is:

1. A fog nozzle comprising a hollow casing having a fluid inlet including a conical portion defining concentric rings of nozzle openings, a diaphragm within the casing, and concentric ridges on the diaphragm resting against the conical portion and partially blocking the nozzle openings at central portions of the latter, the ridges defining concentric annular grooves connected by passageways provided by the portions of the nozzle openings not blocked by said ridges.

2. A nozzle as claimed in claim 1 wherein the circumference of the diaphragm engages the inner surface of said casing between said inlet and said nozzle openings, said circumference being provided with peripheral spiral slots for feeding liquid to the outermost of the annular grooves with a rotary direction, said outermost groove being defined by said circumference and the outermost ridge of said diaphragm.

3. A nozzle as claimed in claim 2 wherein the casing comprises two sections threadably engaged for removal of the diaphragm.

4. A nozzle as claimed in claim 2 wherein the conical portion has a nozzle opening at its apex.

5. A nozzle as claimed in claim 2 wherein each nozzle opening has two connected portions of different cross-sectional widths, the portions of smaller width opening to the exterior of the casing.

References Cited in the file of this patent

UNITED STATES PATENTS

| 472,544 | Lowe | Apr. 12, 1892 |
| 809,383 | Lowe | Jan. 9, 1906 |
| 1,529,531 | Young | Mar. 10, 1925 |
| 1,734,677 | Kreisinger | Nov. 5, 1929 |
| 2,152,251 | Gay | Mar. 28, 1939 |
| 2,180,586 | Gustafsson | Nov. 21, 1939 |
| 2,579,282 | Vicard | Dec. 18, 1951 |

FOREIGN PATENTS

| 314,906 | Great Britain | July 18, 1929 |
| 1,051,600 | France | Dec. 16, 1953 |